US012476943B2

(12) United States Patent
Hawanna et al.

(10) Patent No.: US 12,476,943 B2
(45) Date of Patent: Nov. 18, 2025

(54) RECOMMENDATION ENGINE USING FULLY HOMOMORPHIC ENCRYPTION

(71) Applicant: International Business Machines Corporation, Armonk, NY (US)

(72) Inventors: Varsharani Hawanna, Solapur (IN); Mahesh Shivram Paradkar, Pune (IN); Amrin Maria Khan Adawadkar, Pune (IN); Prashant V Mestri, Pune (IN); Aaliyah Ahmed, Pune (IN); Radha Shridhar Marathe, Pune (IN); Vedangi Rajesh Kirtane, Nashik (IN); Neha Tirumalasetti, Pune (IN)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 17/993,119

(22) Filed: Nov. 23, 2022

(65) Prior Publication Data
US 2024/0171550 A1 May 23, 2024

(51) Int. Cl.
*H04L 9/40* (2022.01)
*H04L 9/00* (2022.01)

(52) U.S. Cl.
CPC .......... *H04L 63/0428* (2013.01); *H04L 9/008* (2013.01)

(58) Field of Classification Search
CPC ............ H04L 63/0428; H04L 9/008
See application file for complete search history.

(56) References Cited

U.S. PATENT DOCUMENTS

2014/0258027 A1* 9/2014 Veugen ............ G06Q 30/0278
                                                    713/168
2016/0012238 A1* 1/2016 Ioannidis ......... H04N 21/25891
                                                    713/189
(Continued)

FOREIGN PATENT DOCUMENTS

CN    104796475 B    10/2018
CN    113935055 A    1/2022
(Continued)

OTHER PUBLICATIONS

"Minimum manhattan distance with certain blocked points"; in Stack Overflow [online]; Jun. 17, 2013 [retrieved on Sep. 11, 2025]; retrieved from the Internet: https://stackoverflow.com/questions/17097015/minimum-manhattan-distance-with-certain-blocked-points (Year: 2013).*
(Continued)

*Primary Examiner* — Michael Simitoski
*Assistant Examiner* — Zhe Liu
(74) *Attorney, Agent, or Firm* — Teddi E. Maranzano

(57) ABSTRACT

An approach is disclosed that receives a request from a requestor over a computer network, the request including a set of encrypted user data that includes interest vectors pertaining to a set of users. A homomorphic encryption processing of the encrypted user data is performed using a distance function that utilizes an encrypted lookup table. This results in a set of distance results. An encrypted distance array is then generated from the distance results. The encrypted distance array describes similarities between the users in the set of encrypted data. A set of encrypted recommendations are returned to the requestor. The recommendations returned are derived from the encrypted distance array.

20 Claims, 6 Drawing Sheets

(56) References Cited

U.S. PATENT DOCUMENTS

| | | | | |
|---|---|---|---|---|
| 2016/0224803 A1* | 8/2016 | Frank | ........... | G06F 21/6245 |
| 2017/0142185 A1* | 5/2017 | Patel | ........... | H04L 67/06 |
| 2017/0169241 A1* | 6/2017 | Unagami | ........... | G09C 1/00 |
| 2022/0100897 A1* | 3/2022 | Nishida | ........... | G06F 21/31 |
| 2023/0053566 A1* | 2/2023 | Horne | ........... | G06F 21/6227 |
| 2023/0327848 A1* | 10/2023 | Soltani | ........... | H04L 9/3231 |
| | | | | 380/28 |
| 2024/0121075 A1* | 4/2024 | Nakagawa | ........... | H04L 9/008 |
| 2024/0154785 A1* | 5/2024 | Shin | ........... | H04L 9/008 |

FOREIGN PATENT DOCUMENTS

| | | |
|---|---|---|
| IN | 202011047741 A | 12/2020 |
| WO | 2016044129 A1 | 3/2016 |

OTHER PUBLICATIONS

Canny, "Collaborative Filtering with Privacy via Factor Analysis," 25th Annual International ACM SIGIR Conference on Research and Development in Information Retrieval, Tampere, Finland, Aug. 2022, 9 pages.

Kim et al., "Efficient Privacy-Preserving Matrix Factorization via Fully Homomorphic Encryption," ASIA CCS '16: ACM Asia Conference on Computer and Communications Security, Xi'an, China, May 2016, 25 pages.

Zekeriya et al., "Generating Private Recommendations Efficiently Using Homomorphic Encryption and Data Packing," IEEE Transactions on Information Forensics and Security, vol. 7, No. 3, Jun. 2012, pp. 1053-1066.

Bergamaschi, "IBM Releases Fully Homomorphic Encryption Toolkit for MacOS and iOS," International Business Machines Corporation, Jun. 2020, 2 pages.

Anonymously, "Privacy Preserving Cancer Prognosis via Fully Homomorphic Encryption," ip.com, IPCOM/00269757D, May 11, 2022, 4 pages.

Badsha et al., "Privacy Preserving User-based Recommender System" 2017 IEEE 37th International Conference on Distributed Computing Systems, Atlanta, GA, Jun. 2017, pp. 1074-1083.

Jumonji et al., "Privacy-Preserving Collaborative Filtering Using Fully Homomorphic Encryption," IEEE Transactions on Knowledge and Data Engineering, Apr. 2021, 14 pages.

Raghuram et al., "Efficient User Profiling in Twitter Social Network Using Traditional Classifiers," Intelligent Systems Technologies and Applications, Advances in Intelligent Systems and Computing, vol. 385. Springer, Cham. https://doi.org/10.1007/978-3-319-23258-4_35, 2016, pp. 399-411.

Swami et al., "Review on Generating Private Recommendations Using Elgamal Homomorphic Encryption," International Journal of Innovative Research in Computer and Communication Engineering, vol. 2, Issue 12, Dec. 2014, pp. 7619-7623.

Erkin et al., "Generating Private Recommendations in a Social Trust Network," 2011 International Conference on Computational Aspects of Social Networks (CASON), Oct. 2011, Salamanca, Spain, pp. 82-87.

Erkin et al., "Privacy-Preserving Content-Based Recommendations through Homomorphic Encryption," 33rd WIC Symposium on Information Theory in the Benelux, May 2012, Boekelo, The Netherlands, 7 pages.

Zekeriya et al., "Privacy Enhanced Recommender System," Researchgate, Jan. 2010, 8 pages.

\* cited by examiner

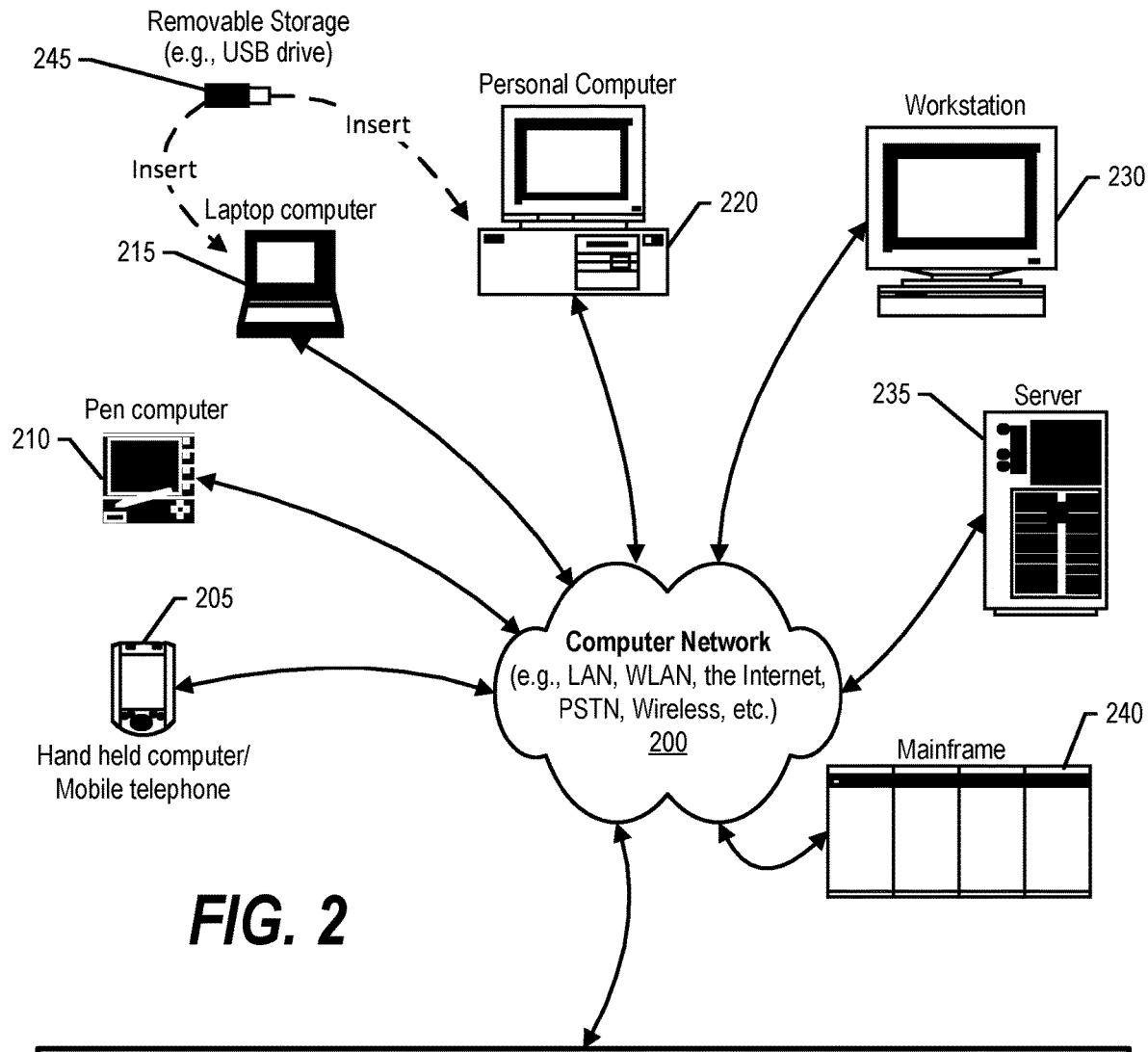
FIG. 2
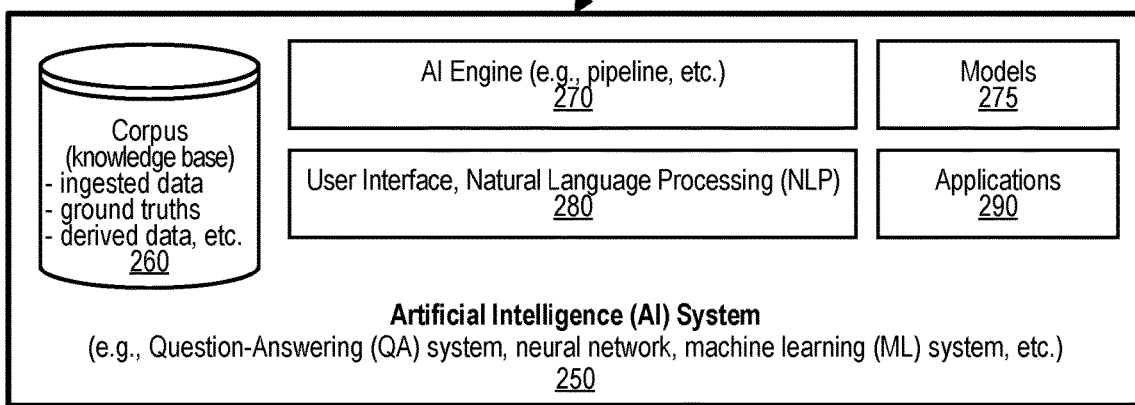

RECOMMENDATION ENGINE USING FULLY HOMOMORPHIC ENCRYPTION

BACKGROUND

Internet services such as social media platforms often provide recommendations to users so that the users can identify new friends, groups, events, and other items of interest to the user. User privacy in such environments is often scrutinized particularly with how such platforms use a user's personal data. Having a platform analyze user data to identify things of interest may have the platform learn many things about a user's preferences, behavior, biometrics, and the like, leaving the user wary about the platform's recommendations. In addition, a user might be concerned that a platform includes items in the recommendations that do not coincide with the users' interests but rather further a platform's marketing goals, such as promoting a particular good or service.

SUMMARY

An approach is disclosed that receives a request from a requestor over a computer network, the request including a set of encrypted user data that includes interest vectors pertaining to a set of users. A homomorphic encryption processing of the encrypted user data is performed using a distance function that utilizes an encrypted lookup table. This results in a set of distance results. An encrypted distance array is then generated from the distance results. The encrypted distance array describes similarities between the users in the set of encrypted data. A set of encrypted recommendations are returned to the requestor. The recommendations returned are derived from the encrypted distance array.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein:

FIG. 2 provides an extension of the information handling system environment shown in FIG. 1 to illustrate that the methods described herein can be performed on a wide variety of information handling systems which operate in a networked environment;

DETAILED DESCRIPTION

Figure 1:
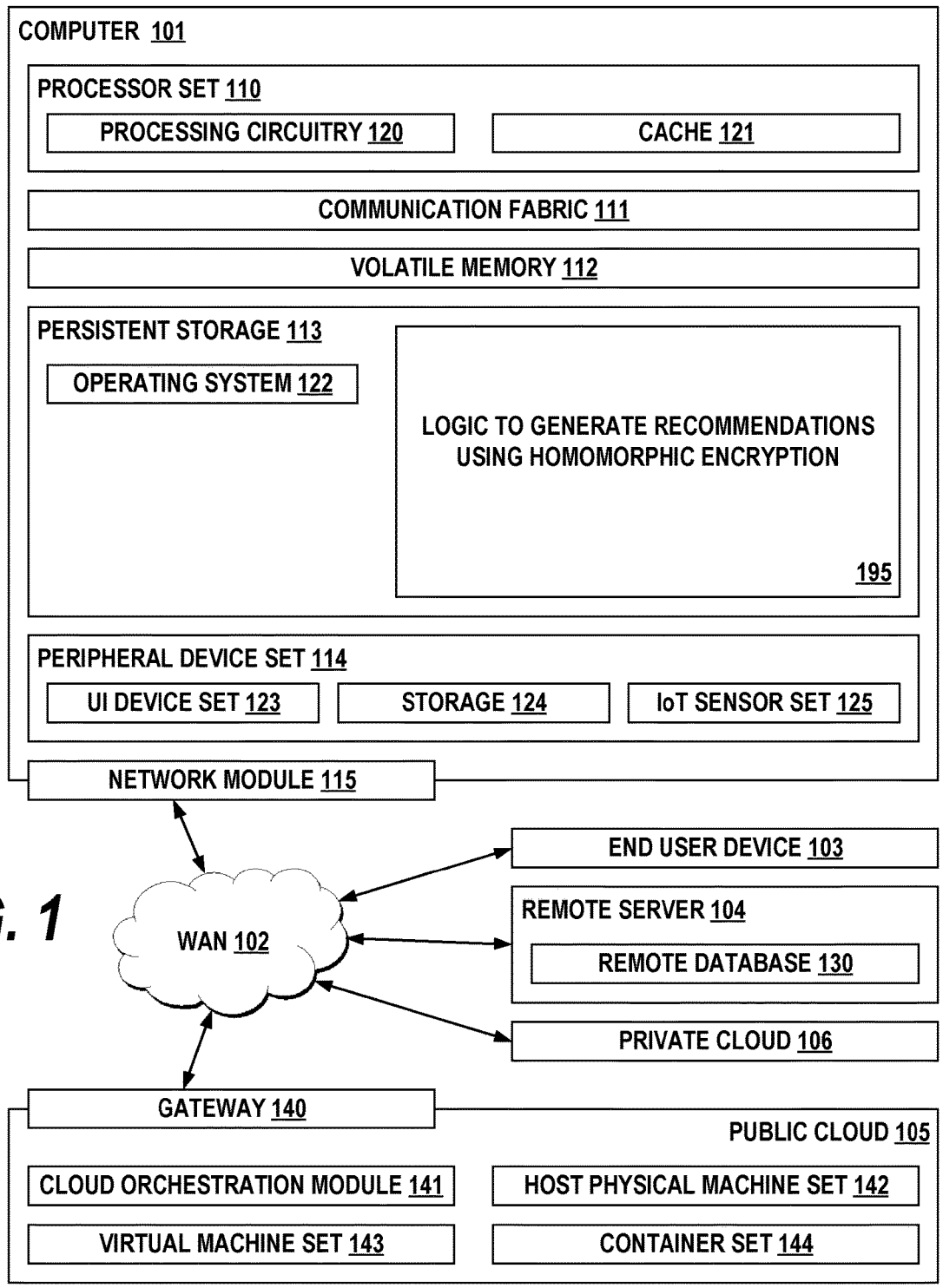
FIG. 1 is a block diagram of a data processing system in which the methods described herein can be implemented.

FIGS. 1-6 describe an approach that improves user privacy when receiving recommendations from online services, such as social media platforms. A third-party recommendation service processes encrypted user data using an encrypted pipeline that analyzes relevant encrypted user data without ever decrypting (deciphering) the user's data as the third-party recommendation service receives encrypted user data and does not have access to an encryption key that would be needed to decrypt the data.

The privacy protected recommendation engine is built using a Fully Homomorphic Encryption scheme and takes insights gained from user information as its encrypted input to provide encrypted recommendations as its output.

A common service provided by social media platforms is the generation of recommendations to find new friends, groups, events and more. These recommendations are generated using data from various sources such as the user's profile, friendships, click logs, and other actions. Service providers often have the additional right to distribute processed data to third parties for commercial purposes or other usage. In traditional environments, this data enables the social media platforms to provide personalized recommendations to the user, thus enhancing their user experience. While this may be advantageous to the user, it also involves threats to a user's privacy.

As in the case of offering a service that depends on users' personal information, the service provider might learn a lot about a user's preferences, past behavior, and biometrics. Current recommendation systems require the stored encrypted user data to be decrypted to perform operations on it to generate recommendations. However, in traditional systems, the information and insights derived from it are sensitive in nature and can be misused for various other services, by the social media companies as well as third parties. The approach described herein uses homomorphic encryption that enables computations on the encrypted data itself to generate encrypted recommendations, thus concealing the user's actual preferences and maintaining the privacy of the uploaded data on the social media platform.

Encrypted user data is collected by the social media company, to provide users with personalized services like recommendations. The user data is aggregated and sent to a third-party recommendation generation service which performs computations on the encrypted data to produce encrypted recommendations. These recommendations are sent to the user via the social media company, and is decrypted at the users' end. Traditionally, recommendations are generated by the social media companies themselves by investing in development of recommendation algorithms as the data is sensitive and cannot be shared.

Development of specialized recommendation algorithms implies that any risk (e.g., quality, bias, etc.) posed by the algorithm and its shortcomings is also borne by the company itself. The system described herein reduces this risk and safeguards the interest of the company as well as the users. This system allows social media companies to outsource recommendation generation to third parties for quality recommendations services. Social Media companies can then avail recommendation services without investing their own resources such as cost, manpower, etc. all without compromising on privacy.

The third-party recommendation service has access to the recommendation algorithm but not the required data. In this manner, this system allows the social media company and the third party to benefit from the exchange of data for a service, while preserving user privacy. Through the proposed system, third parties can take the role of Recommendation-as-a-Service providers, opening up new avenues to conduct business. This in turn may lead to more diversity in the market for recommendation generation services.

Users can be ensured that the recommendations are generated in a way such that their personal data is protected not only from both social media and recommendation generation companies, but also in the cases of privacy breaches. For demonstration of the proposed system, encrypted user data comprises of open source found on the user's platform feeds. This static dataset is preprocessed. Each users' interests are gauged using cosine similarity. A user interest profile (interest vector) is generated for each user. Multiple encrypted user profiles are sent to the third-party service as the encrypted input to the recommendation service. After the recommendation service obtains the encrypted interest vectors, a distance function, such as the Manhattan distance function, is used to calculate the distance between users in order to gauge how similar their interests are to each other.

For calculating Manhattan distance, an encrypted lookup table is used to generate absolute values. Further, a distance array is generated that describes the similarity between the input users and the group of users. This encrypted distance array is then sorted in an ascending order in order to retrieve users closest to the input vectors. Finally, this sorted array is decrypted to return the top three users as recommendations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a block diagram of a data processing system in which the methods described herein can be implemented. Computing environment 100 contains an example of an environment for the execution of at least some of the computer code involved in performing the inventive methods, such as shown in the description of block 195. In addition to block 195, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 195, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 195 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface-type operating systems that employ a kernel. The code included in block 195 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

A NETWORKED ENVIRONMENT is shown in FIG. 2. The networked environment provides an extension of the information handling system shown in FIG. 1 illustrating that the methods described herein can be performed on a wide variety of information handling systems that operate in a networked environment, depicted by computer network 200. Types of computer networks can include local area networks (LANs), wide area networks (WANs), the Internet, peer-to-peer networks, public switched telephone networks (PSTNs), wireless networks, etc. Types of information handling systems range from small handheld devices, such as handheld computer/mobile telephone 205 to large mainframe systems, such as mainframe computer 240. Examples of handheld computer 205 include smart phones, personal digital assistants (PDAs), personal entertainment devices, such as MP3 players, portable televisions, and compact disc players. Other examples of information handling systems include pen, or tablet, computer 210, laptop, or notebook, computer 215, personal computer 220, workstation 230, and server computer system 235. Other types of information handling systems that are not individually shown in FIG. 2 can also be interconnected other computer systems via computer network 200.

Many of the information handling systems include nonvolatile data stores, such as hard drives and/or nonvolatile memory depicted in FIG. 1. These nonvolatile data stores and/or memory can be included, or integrated, with a particular computer system or can be an external storage device, such as an external hard drive. In addition, removable nonvolatile storage device 245 can be shared among two or more information handling systems using various techniques, such as connecting the removable nonvolatile storage device 245 to a USB port or other connector of the information handling systems.

An ARTIFICIAL INTELLIGENCE (AI) SYSTEM is depicted at the bottom of FIG. 2. Artificial intelligence (AI) system 250 is shown connected to computer network 200 so that it is accessible by other computer systems 205 through 240. AI system 250 runs on one or more information handling systems (comprising one or more processors and one or more memories, and potentially any other computing device elements generally known in the art including buses, storage devices, communication interfaces, and the like) that connects AI system 250 to computer network 200. The network 200 may include multiple computing devices 104 in communication with each other and with other devices or components via one or more wired and/or wireless data communication links, where each communication link may comprise one or more of wires, routers, switches, transmitters, receivers, or the like. AI system 250 and network 200 may enable functionality, such as question/answer (QA) generation functionality, for one or more content users. Other embodiments of AI system 250 may be used with components, systems, sub-systems, and/or devices other than those that are depicted herein.

AI system 250 maintains corpus 260, also known as a "knowledge base," which is a store of information or data that the AI system draws on to solve problems. This knowledge base includes underlying sets of facts, ground truths, assumptions, models, derived data, and rules which the AI system has available in order to solve problems. In one embodiment, a content creator creates content in corpus 260. This content may include any file, text, article, or source of data for use in AI system 250. Content users may access AI system 250 via a network connection or an Internet connection to the network 200, and, in one embodiment, may input questions to AI system 250 that may be answered by the content in the corpus of data. As further described below, when a process evaluates a given section of a document for semantic content, the process can use a variety of conventions to query it from the AI system.

AI system 250 may be configured to receive inputs from various sources. For example, AI system 250 may receive input from the network 200, a corpus of electronic documents or other data, a content creator, content users, and other possible sources of input. In one embodiment, some or all of the inputs to AI system 250 may be routed through the network 200. The various computing devices on the network 200 may include access points for content creators and content users. Some of the computing devices may include devices for a database storing the corpus of data. The network 200 may include local network connections and remote connections in various embodiments, such that AI system 250 may operate in environments of any size, including local and global, e.g., the Internet. Additionally, AI system 250 serves as a front-end system that can make available a variety of knowledge extracted from or represented in documents, network-accessible sources and/or structured data sources. In this manner, some processes populate the AI system with the AI system also including input interfaces to receive knowledge requests and respond accordingly.

AI Engine 270, such as a pipeline, is an interconnected and streamlined collection of operations. The information works its way into and through a machine learning system, from data collection to training models. During data collection, such as data ingestion, data is transported from multiple sources, such as sources found on the Internet, into a centralized database stored in corpus 260. The AI system can then access, analyze, and use the data stored in its corpus.

Models 275 are the result of AI modeling. AI modeling is the creation, training, and deployment of machine learning algorithms that emulate logical decision-making based on the data available in the corpus with the system sometimes utilizing additional data found outside the corpus. AI models 275 provide AI system 250 with the foundation to support advanced intelligence methodologies, such as real-time analytics, predictive analytics, and augmented analytics.

User interface 280, such as Natural Language (NL) Processing (NLP) is the interface provided between AI system 200 and human uses. Semantic content is content based on the relation between signifiers, such as words, phrases, signs, and symbols, and what they stand for, their denotation, or connotation. In other words, semantic content is content that interprets an expression, such as by using NLP. Semantic data is stored as part of corpus 260. In one embodiment, the process sends well-formed questions (e.g., natural language questions, etc.) to the AI system. AI system 250 may interpret the question and provide a response to the content user containing one or more answers to the question. In some embodiments, AI system 250 may provide a response to users in a ranked list of answers. Other types of user interfaces (U Is) can also be used with AI system 250, such as a command line interface, a menu-driven interface, a Graphical User Interface (GUI), a Touchscreen Graphical User Interface (Touchscreen GUI), and the like.

AI applications 290 are various types of AI-centric applications focused on one or more tasks, operations, or environments. Examples of different types of AI applications include search engines, recommendation systems, virtual assistants, language translators, facial recognition and image labeling systems, and question-answering (QA) systems.

In some illustrative embodiments, AI system 250 may be a question/answering (QA) system, which is augmented with the mechanisms of the illustrative embodiments described hereafter. A QA type of AI system 250 may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the I QA system. The statistical model may then be used to summarize a level of confidence that the QA system has regarding the evidence that the potential response, i.e. candidate answer, is inferred by the question. This process may be repeated for each of the candidate answers until the QA system identifies candidate answers that surface as being significantly stronger than others and thus, generates a final answer, or ranked set of answers, for the input question.

Figure 3:
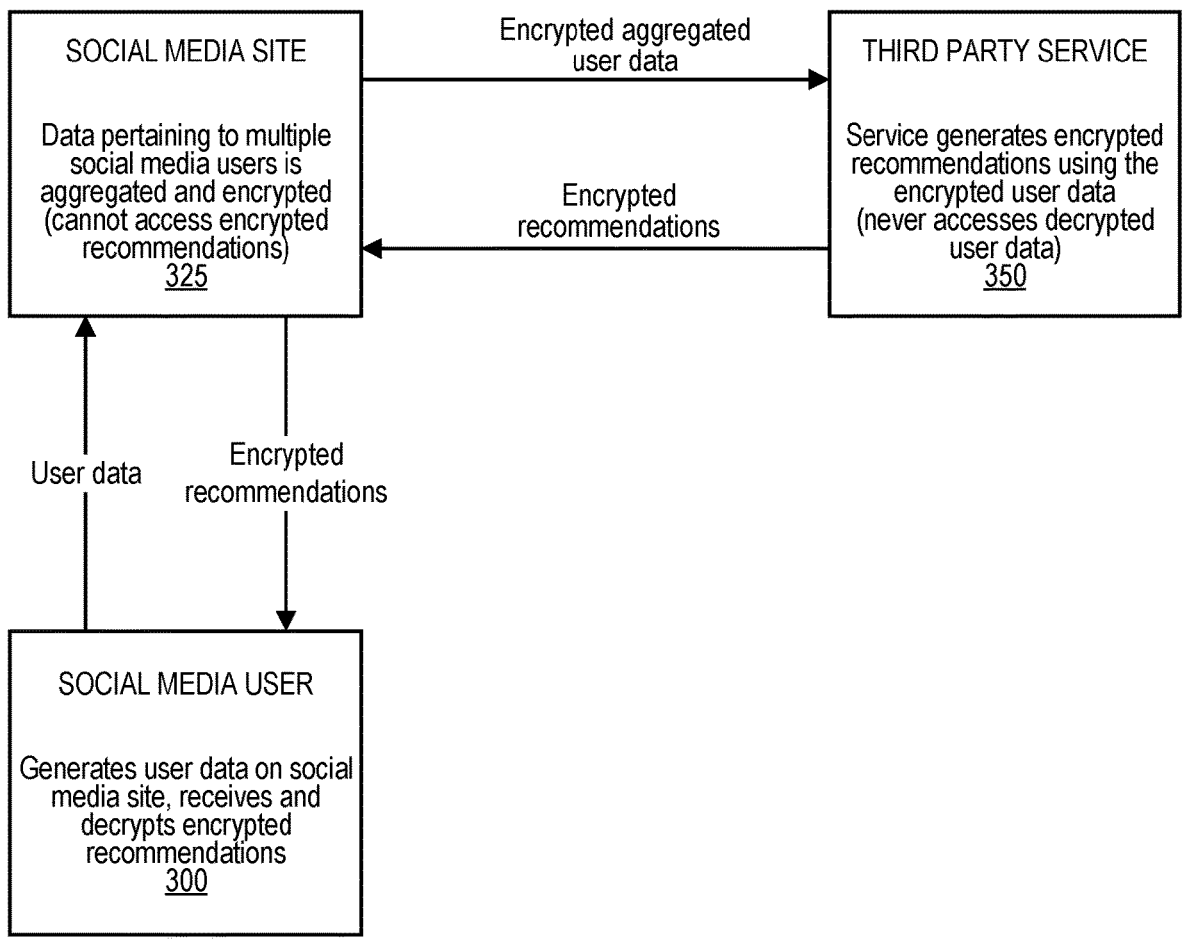
FIG. 3 is a component diagram depicting the entities involved and data exchanged in a recommendation system that uses fully homomorphic encryption.

FIG. 3 is a component diagram depicting the entities involved and data exchanged in a recommendation system that uses fully homomorphic encryption. User 300, such as a user of a social media platform, generates user data that is primarily stored on social media site 325 (e.g., friends, likes, contacts, comments, media, etc.).

Social media site 325 aggregates and encrypts data pertaining to multiple users including user 300. The encrypted aggregate user data is sent to third party recommendation service 350. In one embodiment, the data is encrypted using a key that can be decrypted by user 300 (e.g., encrypted using the user's public key that can be decrypted by the user using the user's private key). In another embodiment, different sets of keys are used to prevent third-party service 350 from seeing the actual data (e.g., a combination of user keys, a combination of a social media key and user keys, etc.). Social media site 325 sends the encrypted data to third-party recommendation service 350.

Third-party recommendation service 350 receives the encrypted data from social media site and does not decrypt the data. Instead, as described herein, third-party recommendation service 350 uses homomorphic encryption techniques to work with the encrypted data in order to identify recommendations (also encrypted and not visible to the third-party recommendation service) that are returned to social media service 325. In one embodiment, where the user's public key was used to encrypt the data, the encrypted recommendation data is forwarded from the social media site to user 300. The user's machine (PC, laptop, etc.) decrypts the encrypted recommendations using the user's private key. In other key embodiments, a combination of social media and/or user keys can be used to decrypt the recommendation data.

Figure 4:
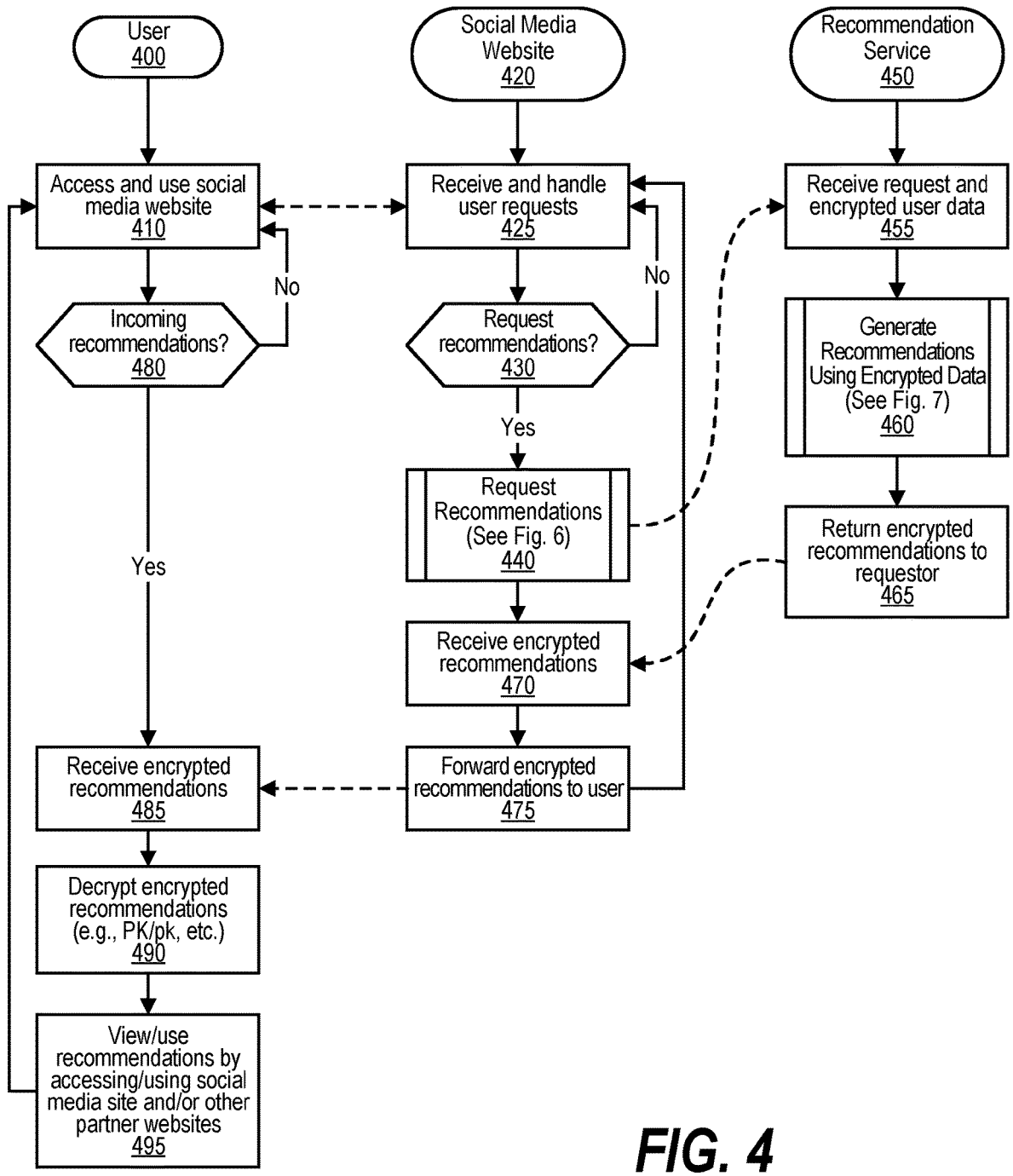
FIG. 4 is a flowchart depicting interactions between the user, the social media platform, and the third-party recommendation service.

FIG. 4 is a flowchart depicting interactions between the user, the social media platform, and the third-party recommendation service. FIG. 4 processing commences at 400 and shows the steps taken by processes performed by user 400, social media website 420, and third-party recommendation service 450 to provide user 400 with recommendations using fully homomorphic encryption. At step 410, the user's process accesses and uses social media website (e.g., posts, media, friends, likes, etc.).

At 420, social media website processing is shown. At step 425, the social media website process receives and handles user requests. Periodically, the website requests recommendations on behalf of the user with the recommendation request being sent to a third-party recommendation service 450. The social media website process determines whether it is time to request recommendations from the third-party recommendation service (decision 430). If it is time to request recommendations from the third-party recommendation service, then decision 430 branches to the 'yes' branch whereupon, at predefined process 440, the social media website process performs the Request Recommendations routine (see FIG. 6 and corresponding text for processing details). On the other hand, if it is not time to request recommendations from the third-party recommendation service, then decision 430 branches to the 'no' branch which loops back to step 425 to continue handling user requests.

Third-party recommendation service processing commences at 450. At step 455, the third-party recommendation service process receives the recommendation request from the social media website along with encrypted user data provided by the social media website. At predefined process 460, the third-party recommendation service process performs the Generate Recommendations Using Encrypted Data routine (see FIG. 7 and corresponding text for processing details). At step 465, the third-party recommendation service process returns encrypted recommendation data to the social media website requestor.

Returning to social media website processing, at step 470, the social media website process receives the encrypted recommendation data from the third-party recommendation service. At step 475, the social media website process forwards encrypted recommendations to user. In one embodiment, the encrypted recommendation data is decrypted by the user (e.g., using the user's private key, etc.). Some aspects of decrypting, such as if a combination of encryptions were performed, may be performed by the social media website before the encrypted recommendation data is returned to the user.

Returning to user processing, at step 480, the user process determines whether there are incomings recommendations (decision 480). If there are incoming recommendations, then decision 480 branches to the 'yes' branch to receive the recommendations by performing steps 485 through 495. On the other hand, if no there are no incoming recommendations from the social media website, then user processing loops back to step 410 to continue using the social media website.

At step 485, the user process receives the encrypted recommendations from social media website. At step 490, the user process decrypts the encrypted recommendations (e.g., using the user's private encryption key, etc.). At step 495, the user process allows the user to view and use the decrypted recommendations by accessing and using the social media site and/or other partner websites to which the recommendations pertain.

Figure 5:
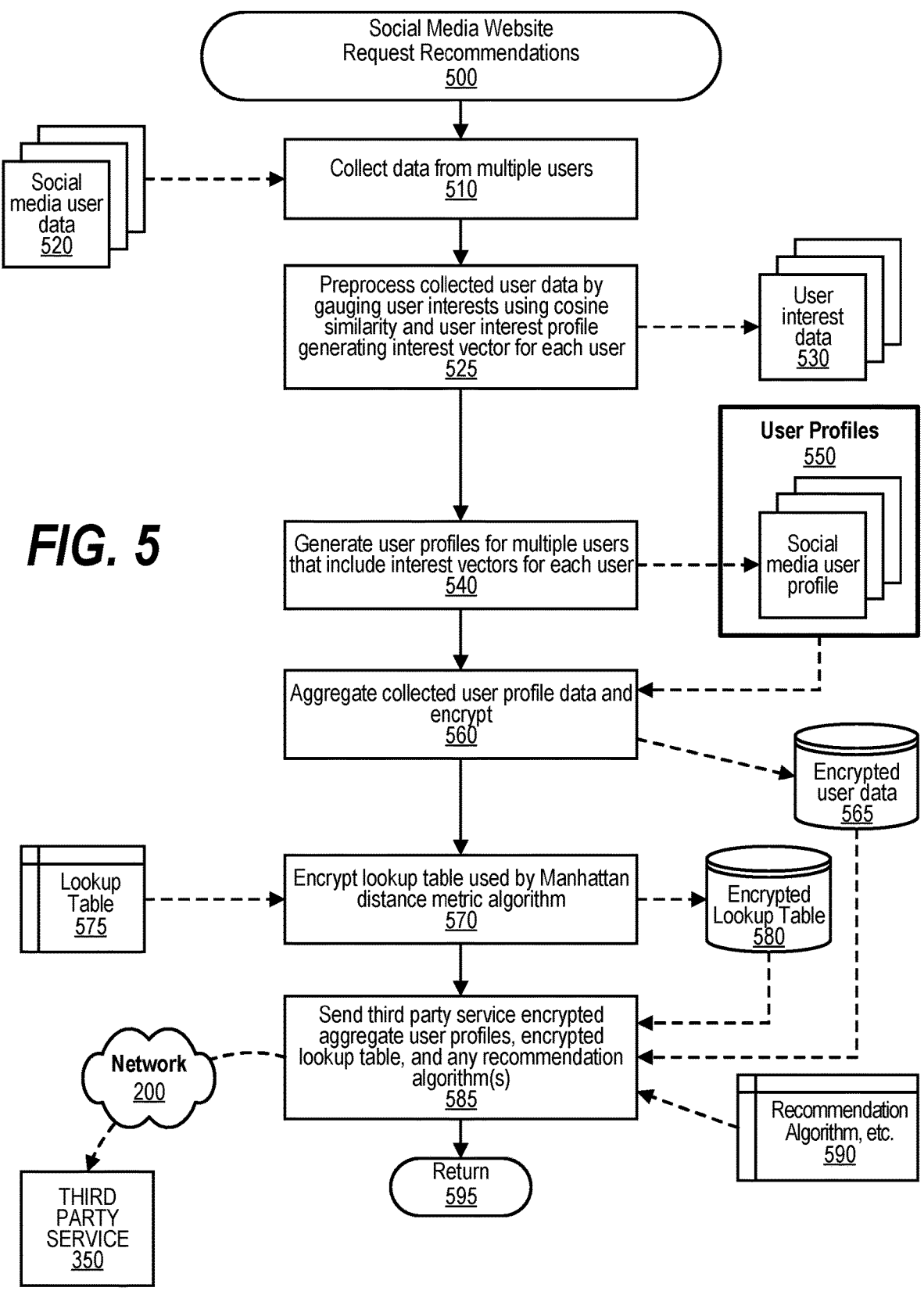
FIG. 5 is a flowchart depicting more detailed processing performed by the social media website to request recommendations from a third-party recommendation service using homomorphic encryption.

FIG. 5 is a flowchart depicting more detailed processing performed by the social media website to request recommendations from a third-party recommendation service using homomorphic encryption. FIG. 5 processing commences at 500 and shows the steps taken by a process performed by a social media website when requesting recommendations from a third-party recommendation service.

At step 510, the social media website process collects data from multiple users of the social media website. The social media user data is retrieved from data store 520. At step 525, the social media website preprocesses the collected user data by gauging user interests using cosine similarity and user interest profiles to generate interest vectors for each user. The generated user interest data is stored in memory area 530.

At step 540, the social media website process generates user profiles for multiple social media users with the profiles including interest vectors for each of the users. The user profiles are stored in user profile data store 550. At step 560, the social media website process aggregates the collected user profile data and encrypts (e.g., using a user's public key, a combination of keys, etc.) The encrypted user data is stored in data store 565.

At step 570, the social media website process encrypts a lookup table that is used by Manhattan distance metric algorithm. The lookup table data is retrieved from memory area 575 and the encrypted lookup table is stored in data store 580.

At step 585, the social media website process sends the third-party recommendation service the encrypted aggregate user profiles, the encrypted lookup table, and any recommendation algorithm(s) that the social media website wishes the third-party recommendation service to use to generate recommendations (e.g., types of recommendations, amount of recommendation data to return, etc.). The request and accompanying data are sent to third-party recommendation service 350 via computer network 200. FIG. 5 processing thereafter returns to the calling routine (see FIG. 4) at 595.

Figure 6:
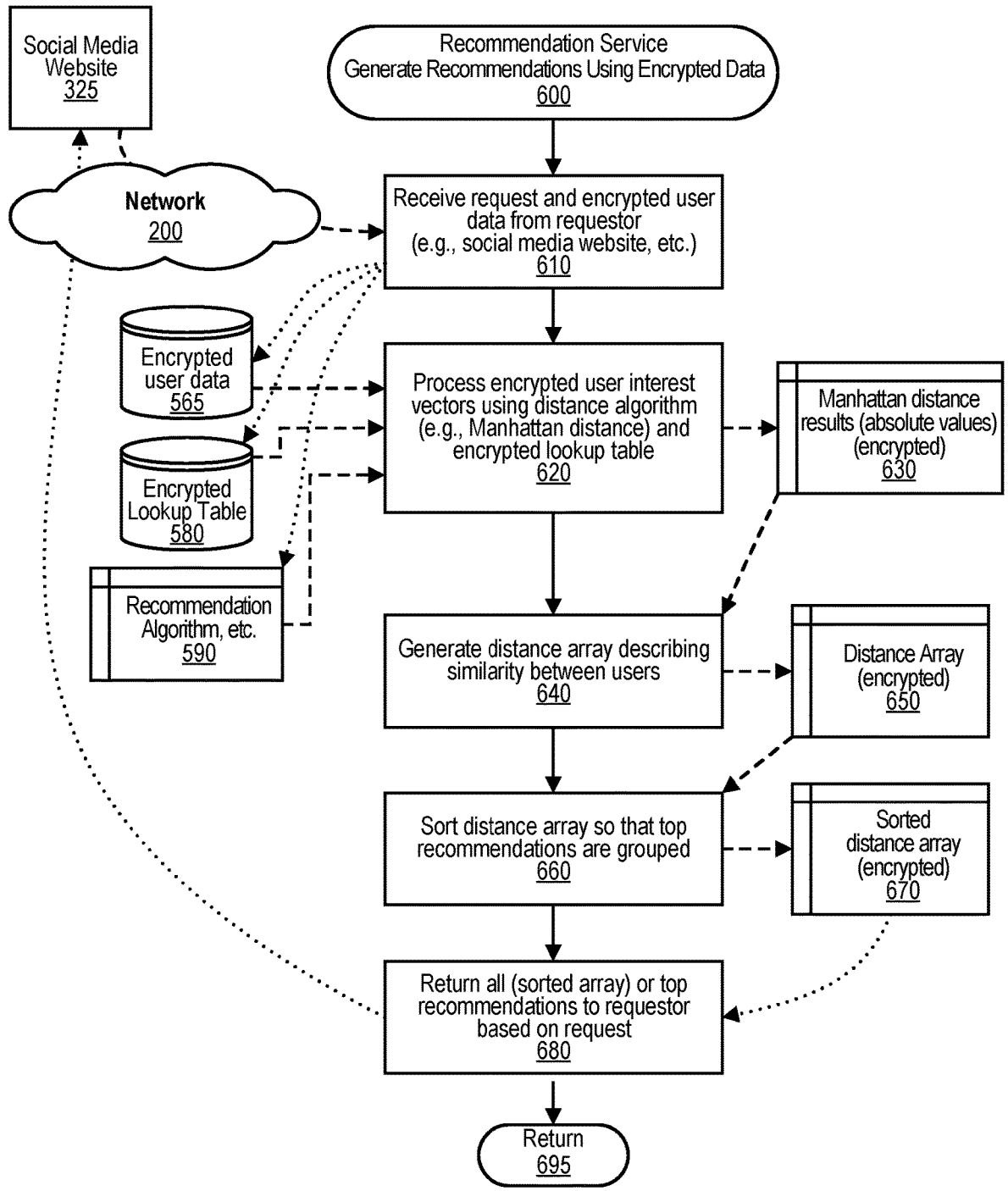
FIG. 6 is a flowchart depicting more detailed processing performed by the third-party recommendation service to process recommendation requests using homomorphic encryption.

FIG. 6 is a flowchart depicting more detailed processing performed by the third-party recommendation service to process recommendation requests using homomorphic encryption. FIG. 6 processing commences at 600 and shows the steps taken by a process performed by a third-party recommendation service that generates recommendations for users using homomorphic encryption techniques on encrypted user data.

At step 610, the third-party recommendation service process receives the recommendation request and the encrypted user data from requestor (e.g., social media website 325 via computer network 200, etc.). At step 620, the third-party recommendation service processes the encrypted user interest vectors using a distance algorithm, such as the Manhattan distance function, etc. and the encrypted lookup table. The encrypted user data is received from data store 565 and the encrypted lookup table is retrieved from data store 580. Recommendation request data, such as the algorithm to use and the amount of recommendations to return, is stored in memory area 590 and might not be encrypted. The result of step 620 is a set of distance results in absolute values that is also encrypted data with the results being stored in memory area 630.

At step 640, the third-party recommendation service process generates a distance array describing the similarity between users based on the absolute distances that were stored in memory area 630. The distance array, also encrypted, is stored in memory area 650. At step 660, the third-party recommendation service process sorts the distance array so that the top recommendations are grouped either at the top or the bottom of the array depending on the sort performed. The sorted distance array, also encrypted, is stored in memory area 670.

At step 680, the process returns the data in encrypted sorted array 670 or a set of top recommendations from the distance array to the requestor depending on the particular request. Third-party recommendation service sends the encrypted recommendation data to social media website 325 via computer network 200. FIG. 6 processing thereafter returns to the calling routine (see FIG. 4) at 695.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, performed by an information handling system that includes a processor and a memory accessible by the processor, the method comprising:
   receiving a request from a requestor over a computer network, wherein the request includes a set of encrypted user data that includes a plurality of encrypted user interest vectors, an encrypted lookup table, and any recommendation algorithm(s);
   processing, without decrypting, the encrypted user interest vectors and the encrypted lookup table using a Manhattan distance function, giving a set of encrypted distance results in absolute values;
   based on the absolute distance results, generating, without decrypting the encrypted user interest vectors and the encrypted lookup table, an encrypted distance array describing a similarity between users, and storing the encrypted distance array in a memory area;
   sorting the encrypted distance array, without decrypting the encrypted distance array, wherein top recommendations are grouped, and storing the sorted encrypted distance array in a memory area; and
   returning a set of encrypted recommendations to the requestor, wherein the encrypted recommendations are derived from the sorted encrypted distance array.

2. The method of claim 1 further comprising:
   homomorphic encryption sorting of the encrypted distance array that groups a set of top recommendations that are returned to the requestor.

3. The method of claim 2 further comprising:
   homomorphic encryption selection of a predetermined number of the set of top recommendations from the sorted encrypted distance array, wherein the predetermined number of recommendations from the set of top recommendations are returned to the requestor.

4. The method of claim 1 further comprising:
   receiving the request from a social media platform, wherein the set of encrypted user data corresponds to users of the social media platform.

5. The method of claim 1 further comprising:
   receiving the encrypted lookup table from the requestor.

6. The method of claim 1 wherein the encrypted recommendations being decipherable by a selected one of the users included in the set of encrypted user data, and wherein the encrypted recommendations are undecipherable by the requestor.

7. The method of claim 1 wherein the encrypted recommendations being decipherable by the requestor.

8. An information handling system comprising:
   one or more processors;
   a memory coupled to at least one of the processors; and
   a set of instructions stored in the memory and executed by at least one of the processors to:
      receiving a request from a requestor over a computer network, wherein the request includes a set of encrypted user data that includes a plurality of encrypted user interest vectors, an encrypted lookup table, and any recommendation algorithm(s);
      processing, without decrypting, the encrypted user interest vectors and the encrypted lookup table using a Manhattan distance function, giving a set of encrypted distance results in absolute values;
      based on the absolute distance results, generating, without decrypting the encrypted user interest vectors and the encrypted lookup table, an encrypted distance array describing a similarity between users, and storing the encrypted distance array in a memory area;
      sorting, the encrypted array without decrypting the encrypted distance array, wherein top recommendations are grouped, and storing the sorted encrypted distance array in a memory area; and
      returning a set of encrypted recommendations to the requestor, wherein the encrypted recommendations are derived from the sorted encrypted distance array.

9. The information handling system of claim 8 further comprising:
   homomorphic encryption sorting of the encrypted distance array that groups a set of top recommendations that are returned to the requestor.

10. The information handling system of claim 9 further comprising:
    homomorphic encryption selection of a predetermined number of the set of top recommendations from the sorted encrypted distance array, wherein the predetermined number of recommendations from the set of top recommendations are returned to the requestor.

11. The information handling system of claim 8 further comprising:
    receiving the request from a social media platform, wherein the set of encrypted user data corresponds to users of the social media platform.

12. The information handling system of claim 8 further comprising:
    receiving the encrypted lookup table from the requestor.

13. The information handling system of claim 8 wherein the encrypted recommendations being decipherable by a selected one of the users included in the set of encrypted user data, and wherein the encrypted recommendations are undecipherable by the requestor.

14. The information handling system of claim 8 wherein the encrypted recommendations being decipherable by the requestor.

15. A computer program product comprising:
   a computer readable storage medium comprising a set of computer instructions, the computer instructions effective to perform steps comprising;
   receiving a request from a requestor over a computer network, wherein the request includes a set of encrypted user data that includes a plurality of encrypted user interest vectors, an encrypted lookup table, and any recommendation algorithm(s);
   processing, without decrypting, the encrypted user interest vectors and the encrypted lookup table using a Manhattan distance function, giving a set of encrypted distance results in absolute values;
   based on the absolute distance results, generating, without decrypting the encrypted user interest vectors and the encrypted lookup table, an encrypted distance array describing a similarity between users, and storing the encrypted distance array in a memory area;
   sorting the encrypted distance array, without decrypting the encrypted distance array, wherein top recommendations are grouped, and storing the sorted encrypted distance array in a memory area; and
   returning a set of encrypted recommendations to the requestor, wherein the encrypted recommendations are derived from the sorted encrypted distance array.

16. The computer program product of claim 15 further comprising:
   homomorphic encryption sorting of the encrypted distance array that groups a set of top recommendations that are returned to the requestor.

17. The computer program product of claim 16 further comprising:
   homomorphic encryption selection of a predetermined number of the set of top recommendations from the sorted encrypted distance array, wherein the predetermined number of recommendations from the set of top recommendations are returned to the requestor.

18. The computer program product of claim 15 further comprising:
   receiving the request from a social media platform, wherein the set of encrypted user data corresponds to users of the social media platform.

19. The computer program product of claim 15 further comprising:
   receiving the encrypted lookup table from the requestor.

20. The computer program product of claim 15 wherein the encrypted recommendations being decipherable by a selected one of the users included in the set of encrypted user data, and wherein the encrypted recommendations are undecipherable by the requestor.

* * * * *